United States Patent [19]

Wolf et al.

[11] Patent Number: 4,500,300

[45] Date of Patent: Feb. 19, 1985

[54] ROTATIONALLY ELASTIC COUPLING

[75] Inventors: Franz-Josef Wolf, Bad Soden-Salmünster; Hubert Pletsch, Birkenau, both of Fed. Rep. of Germany

[73] Assignee: WOCO Franz-Josef Wolf & Co., Bad Soden-Salmünster, Fed. Rep. of Germany

[21] Appl. No.: 445,386

[22] Filed: Nov. 29, 1982

[30] Foreign Application Priority Data

Mar. 26, 1982 [DE] Fed. Rep. of Germany ....... 3211238

[51] Int. Cl.³ ............................ F16D 3/68; F16D 3/50
[52] U.S. Cl. ....................................... 464/83; 464/85; 464/89; 464/90
[58] Field of Search ................................. 464/81-85, 464/87, 89, 90, 92, 74, 93

[56] References Cited

U.S. PATENT DOCUMENTS

| | | | |
|---|---|---|---|
| 2,833,131 | 5/1958 | Miller | 464/83 X |
| 3,386,264 | 6/1968 | Paulsen | 464/83 X |
| 4,252,227 | 2/1981 | Staub, Jr. | 464/83 X |
| 4,277,958 | 7/1981 | Hackforth et al. | 464/85 X |
| 4,368,050 | 1/1983 | Peterson | 464/83 |
| 4,380,442 | 4/1983 | Amsel | 464/93 |
| 4,424,046 | 1/1984 | Ziegler | 464/74 |

Primary Examiner—John Petrakes
Attorney, Agent, or Firm—Jordan and Hamburg

[57] ABSTRACT

The rotationally elastic coupling makes possible the utilization of large twist angles between the two half couplings by converting the relative twist of the two half couplings into a radially directed translation by means of an eccentric link, a crank link or another appropriate movement-converting link which converts a rotational movement into a translation; the radially directed translation has an effect in the radial direction on sprung elastic intermediate links. The rotationally elastic coupling is particularly suitable for application in motor vehicle clutches and as a suppressor.

22 Claims, 9 Drawing Figures

ROTATIONALLY ELASTIC COUPLING

DESCRIPTION

The invention concerns a rotationally elastic coupling in which the two half couplings are connected with one another by at least one sprung intermediate link.

Couplings of this type provide for the rotationally elastic transmission of torques between two shafts, in particular coaxial shafts.

Rotationally elastic couplings of the type being discussed generally consist of concentrically arranged half couplings with alternately arranged interlacing or overlapping claws, supports or end stops between which sprung intermediate links are placed. These sprung intermediate links generally consist of an elastomer and are embodied, in particular, in the form of elastic tensile ties, in the form of struts, in the form of buffers and also in the form of annular bulges or beaded discs.

A disadvantage of all the known rotationally elastic couplings of this type is the fact that the sprung angle between the two half couplings is too small and that the sprung intermediate links are loaded in both compression and tension or exclusively in shear, such load reversals leading rapidly to irreversible material fatigue, particularly where an elastomer is used as the material for the sprung intermediate links. "Sprung angle" is taken to mean the maximum angle of twist through which the two half couplings can be rotated relative to one another giving a sprung and damping action within a sensibly usable working range.

A rotationally elastic coupling of the type mentioned at the beginning is also known from U.S. Ser. No. 146,253 of May 5th 1980, now abandoned, in which the sprung intermediate links consisting of an elastomer are only put under compression independent of the rotational direction of the transmission half coupling; however, even with this rotationally elastic coupling, the sprung angle is only a few degrees. This known rotationally elastic coupling, in common with all other known rotationally elastic couplings, does not provide a spring characteristic extending beyond a sprung angle range of 15° or 20°.

However, numerous fields of technology are, with increasing frequency, expressing the requirement for a rotationally elastic coupling with quite substantially larger sprung angles. In particular, this requirement is currently present in the field of vehicle building. The requirement to save fuel shows a clear tendency in the automobile construction field for the use of engines of lower speed. Such engines have in fact become available in the meantime in sufficient quantity and operationally tested but their application has, up to now, been prevented by the lack of rotational elasticity in the known couplings. Engines which, for example, should provide a reliable drive away of a motor vehicle at engine speeds in the region of about 200 to 400 rpm, require rotationally elastic couplings with sprung angles of at least about 35°. Using the known rotationally elastic couplings, the load reversal impact torques occurring at low rotational speeds or with hectic driving techniques cannot be absorbed and these lead to load reversal vibrations in the longitudinal direction of the vehicle. Furthermore, the resonant vibrations occurring in the longitudinal direction of motor vehicles cannot be subcritically decoupled using the known rotationally elastic couplings. For this reason, the known rotationally elastic couplings with twist angle characteristics or sprung angles of up to a maximum of 20° are only used for obviating transmission noise in motor vehicles but are not tuned to damp out the load reversal impact torques.

In view of this state of the art, the invention is base on the task of producing a rotationally elastic coupling with a longer operating life and making possible the use of a twist angle characteristic or a sprung angle of much more than 20°, in particular up to more than 90°.

In order to solve this problem, the invention produces a rotationally elastic coupling of the type mentioned at the beginning having the characteristics important to the invention.

The basic idea of the invention is thus to replace the mainly tangential or secantial compressive or shear load on the sprung intermediate links located between the half couplings by an at least mainly radial and translational load on the sprung intermediate links using a conversion of the relative twist between the two half couplings via a convertor of movement direction, for example an eccentric.

By appropriate matching of the convertor link, for example the eccentricity of the eccentric link or the crank link, and the spring characteristics of the sprung intermediate links relative to one another, sprung angles of up to ±180° can be made usable.

The conversion of a relative twist between the two preferably mutually coaxial half couplings into an at least substantially translational radially inwards or outwards component of force and movement, to which the sprung intermediate links are subjected, can occur in principle by means of crank links or eccentric links, for example, and preferably occurs by means of an eccentric link. This eccentric link is embodied in particular as an eccentric disc or as a group of axial eccentric discs in series, which is or are connected eccentrically or rotationally solidly with one half coupling and are supported or are carried or guided with sliding or rotational freedom on at least one or several of the sprung intermediate links, of which each is preferably associated with one eccentric disc.

The sprung intermediate links are preferably manufactured from reinforced or unreinforced elastomer but can also be made from sprung steel and, for example, have the form of helical springs, elliptical springs or specially adapted shaped leaf springs. When using an elastomer for producing the sprung intermediate links, the compressive loading capability of the elastomer can be increased in a manner known per se by vulcanizing in sheet metal components to prevent lateral extension. If the coupling is constructed to be coaxial and concentric with respect to the two half couplings, the sprung intermediate links are preferably embodied in the form of at least substantially cylindrical curved shell elements. Each of these rubber-elastic shell elements is rotationally solidly connected with one of the half couplings by means of one of its cylindrical curved outer surfaces and may, for example, be screwed, glued and/or vulcanized onto the latter, preferably attached by matching shapes, in particular attached by insertion in the axial direction, or clipped on and connected by its other cylindrical outer surface with a support or bearing element, in which the link converting the rotation into a radial translation or vice versa, i.e. the eccentric link, for example, of the other half coupling is supported or with which the latter makes contact.

When a torque is applied to the half coupling rotationally solidly connected to the convertor link, this torque is converted via the convertor link, i.e. an eccentric, for example, into radially directed work acting on the sprung intermediate link. The force from this work is counter-acted by the spring force of the sprung intermediate link to an increasing extent until the load torque on the other, output side half coupling and the driving torque on the loaded input side half coupling are in torsional equilibrium. The magnitude of the twist angle at the moment of this torsional equilibrium, i.e. the angle by which the two half couplings are twisted relative to one another, depends on the tuning of the coupling, i.e. on the tuning of the degree of eccentricity of the eccentric and the spring characteristic of the sprung intermediate links, for example. For example, the softer the spring characteristic of the sprung intermediate links for a given eccentricity of the eccentric link, the greater will be the twist angle which will appear for a given torque magnitude in the torque equilibrium. Again, the greater this twist angle is in the range of torque equilibrium, the softer will be the torque transmission behaviour of the coupling in the torque/twist angle characteristic, i.e. the spring characteristic of the rotationally elastic coupling.

For normal operation, the eccentric geometry and the spring characteristics of the sprung intermediate links will preferably be designed so that the maximum torque which is to be expected under normal operating conditions and to which the coupling will be subjected will produce a twist angle in the range from approximately 60° to 100°. The angular displacement (from approximately 80° to 120°) remaining between the twist angle tuned and set in this manner and the maximum possible sprung angle of 180° is then available for ensuring soft and shock-free overload protection.

Thus, for example, a coupling which is designed for a twist angle of 90° with the maximum torque of normal operation, can without difficulty be subjected to suddenly occurring substantially greater torques than the maximum to be expected in normal operation without this leading to bumps, shocks or rupture in the driven shaft because such torsional impacts are taken up by the rotationally elastic coupling with a soft progression of the characteristic but without bottoming up to a sprung angle of 180°, i.e. twice the amount of the normal maximum twist angle of 90° considered in this example. If torques are introduced to the coupling which even exceed this safety range, only "slipping" of the coupling then occurs. If the two half couplings are twisted relative to one another by an angle greater than 180°, the sprung intermediate links are progressively unloaded (ignoring the possible occurrence of some trivial shear forces) and this continues until the two half couplings have completed a relative twist of 360°, referred to the unloaded zero position of the coupling; at this point, increasing radial loading of the sprung intermediate links appears again, which is characteristic of the normal operation of the coupling.

The rotationally elastic coupling in accordance with the invention in the embodiment described above thus provides an absolutely operationally safe overload protection for the force transmission in which bottoming and damage cannot occur and which may be described as ideal.

As an alternative, however, the slipping of the coupling under overload conditions described above can be limited by end stop means, such end stop means limiting either the radial sprung path of the sprung intermediate links or the relative twist of the two half couplings relative to one another by means of claw stops. Such end stop means are desirable in cases in which a vertical end to the spring characteristic of the coupling is not damaging and/or is acceptable and should or must be operated in favour of larger sprung angle ranges for normal operation with smaller reserve ranges of the twist angle. Thus such end stop means are preferably provided when the coupling is, for example, designed for a sprung angle of 170° for the maximum torques expected during normal operation. For safety reasons also, it is often necessary to prevent slipping of the coupling by end stop means.

Finally, usable sprung angles of much more than 180° without bottoming can be obtained in a simple manner by arranging that the eccentric link connected rotationally solidly and eccentrically with one half coupling can be simultaneously displaced axially relative to this half coupling, for example while guiding the axial displacement by acting on the sprung intermediate links, so that instead of the usable semi-circular eccentric working line in one plane, a helical working line can be used permitting, in principle, any given sprung angle. In other words, if the usual disc-shaped eccentric is thus replaced as the convertor link by a radially rotationally solid but axially displaceable sleeve with helical cam surfaces, relative twist angles of the two half couplings with respect to one another of well beyond 180° are also possible.

Instead of the eccentric link, crank link or the sleeve link described above, any other movement-converting intermediate link can finally, in principle, be used provided there is a guarantee that such a movement-converting intermediate link converts a relative twist of the half coupling to which it is connected (relative to the other half coupling) into an at least substantially radially directed translational force component and movement component. In addition to the machine elements quoted, the most varied extension mechanisms could, for example, be used for this conversion. In this connection, the choice among the elements available in principle depends primarily also on the magnitude of the forces to be transmitted.

The sprung intermediate links, whether they are steel springs of the most varied construction or elastomer bodies, can be arranged in the unloaded coupling with either negative or positive prestressing or without prestressing. By negative prestressing, for example, is meant a tensile prestressing of the spring element where this is loaded compressively. On the other hand, a tensile prestressing of the spring element would be a positive prestressing if the spring element has a tensile loading during normal operation of the coupling. The type of prestressing or, in some cases, the use of unstressed sprung intermediate links, depends in each case on the requirements of the individual application or, more precisely, on the spring characteristic expected from the coupling for the individual case. If, as a particular example, a mass produced coupling is to be applied with varying tuning for different purposes, this can be achieved in a particularly advantageous manner if the sprung intermediate links, for example elastomer bodies, are enclosed in a surrounding cage which is part of the half coupling or is connected to it by shaped fitting, the diameter of this cage being variable within the desired ranges by means of appropriate tensioning and de-tensioning means. For example, if a particular coupling is designed for transmitting a torque of 100 Nm at a twist angle of 90° and the same coupling has to transmit a torque of 130 Nm, for example, with the same spring angle of 90°, then it is only necessary with a coupling designed as a cage coupling of this type to more tightly tension the cage surrounding and prestressing the sprung intermediate links in order to meet these conditions.

When using rubber springs or rubber-metal springs as the sprung intermediate links, the torque/twist angle characteristic, i.e. the spring characteristic of the coupling, can be altered and set in a particularly simple manner for both experimental purposes and for series manufacture if the spring elements are designed as exchangeable elements shaped fixedly in the rotational direction and insertable in the axial direction for half couplings arranged concentrically in a radial plane; in particular, the elements may be rubber-metal springs with at least one radially outer and one radially inner metal plate holding the spring element. The characteristics can be chosen and adapted at will by various combinations of such individual elements and, in particular, can also be different in the two opposed rotational directions of the relative twist of the two half couplings. When using the coupling for vehicles, for example, it is thus possible to provide differing spring characteristics of the coupling for forward and reverse movement by inserting appropriate rubber springs between the two half couplings.

In axial section, the rubber-metal springs can, in principle, have any given shape according to the particular knowledge of this field of constructional technology. Thus the elastomer cross-section of the rubber springs in the axial direction can, for example, be substantially rectangular, V-shaped with apex pointing either inwards or outwards or be provided with one or more internal spaces or damping spaces.

When loading the coupling, i.e. when introducing work to one of the half couplings, the elastomer of the rubber spring, when such is used as the sprung intermediate link of the coupling, will preferably be put under compression during normal operation. This causes the elastomer to form annular bulges in the axial direction which, under certain circumstances, for particular applications—for example in heavy vehicles—can lead to an excessively "soft" spring characteristic of the coupling, i.e. to an excessively weak progression of the transmitted torque as a function of the twist angle. This situation can, if required, be corrected, i.e. the spring characteristic can be stiffened and hence become progressively stronger if the coupling or at least the unloaded annular rubber surfaces of the rubber springs or rubber-metal springs lying axially sidewards in the radial plane are enclosed by sheet metal on both sides in the form of a capsule or a cage. This encapsulation can then occur such that in the unloaded condition of the coupling, i.e. without work being fed into the coupling, the side annular surfaces of the rubber springs are at a certain distance from the sheet metal on the side of the cage or, alternatively, are in direct contact with the inner wall of the sheet metal of the cage. In the first case, loading the coupling produces first a soft characteristic and then, after the bulging rubber comes into contact with the sheet metal of the cage, a progressively steepening characteristic; in the second case, an initially steep, i.e. strongly progressive characteristic of the coupling is produced by a reduction of the freely deformable unloaded surface of the rubber spring. In particular, by using removable and exchangeably connected rubber spring elements with varying Shore hardnesses and varying geometric shapes and, in particular, distances from the internal walls of the capsule sheet metal or the cage sheet metal, a practically unlimited multiplicity and fine adjustment of the desired coupling spring characteristics for any particular case can be obtained. Such an enclosed encapsulation of the spring elastomer limited on all sides can also make it possible to set and obtain such a strongly progressive variation of the spring characteristic that this can also be designed as the end stop and hence a higher twist angle of the coupling can be used.

In this connection, there is a further manufacturing technique advantage in the encapsulation of the coupling on all sides. For example, when using the coupling as a clutch in motor vehicles, the lining carrying plate can be arranged in one piece with one of the two sheet metal parts forming the sidewards encapsulation of the coupling; this then operates simultaneously as the centering element and can be pressed directly onto the central sleeve of the clutch and, for example, be retained by a circlip.

If the convertor link is an eccentric, the eccentric link is generally so arranged and directed that it is in its dead centre position when the coupling is unloaded. With this zero position of the eccentric for the unloaded coupling, the full 180° of useful sprung angle is available in both rotational directions. However, a typical characteristic of the eccentric geometry is that with initial twist of the eccentric from its dead centre position, this twist is only converted into a very short translational displacement path. For applications in which such a very soft commencement of the spring effect of the rotationally elastic coupling is undesirable, the eccentric can be so set and arranged that with the coupling unloaded it is deflected from its dead centre position by an angle which is prescribed by and depends on the particular requirements of the individual application. Such deflection from the zero position of the coupling out of the dead centre position of the eccentric can take place in either the positive or the negative direction. In this respect, the determination of the deflection of the zero position from the dead centre of the eccentric can, in principle, occur in any given and known manner, for example by an appropriately twisted arrangement of the bearing carrying the eccentric, which is connected with the sprung intermediate links.

The rotationally elastic coupling is preferably so designed that the input and output are coaxial.

The rotationally elastic coupling according to the invention is characterised by an unusually large degree of adaptability, namely with respect to the twist angles to be set, the torques to be transmitted and also the size of the construction. Because of these properties, the rotationally elastic coupling in accordance with the invention can be applied in practically any given field of technology wherever torques have to be transmitted rotationally elastically. The coupling can be applied particularly as a damping link in propulsion systems, serving at the same time as an effective overload protection. However, the rotationally elastic coupling according to the invention is currently most important in motor vehicles where it can be applied particularly to the damping of impact torques at low and extremely low engine speeds. The rotationally elastic coupling in accordance with the invention can, in this connection, be applied with particular advantage in the currently used clutches in motor vehicles and, in particular, between the clutch plate of the clutch and the output shaft of the clutch or input shaft of the gear box. Driving tests carried out by the applicant have shown that using motor cars currently commercially available, it is possible to drive away smoothly in 4th gear, i.e. at large conversion ratios, even if the usual lining springs for currently conventional clutches are removed.

Because of the large sprung angles, the extreme robustness and endurance and the practically unlimited settings of spring characteristics, the rotationally elastic coupling according to the invention will preferably continue to be applied as a suppressor, particularly a low frequency suppressor in motor vehicles.

The invention is described in more detail below using illustrative examples in conjunction with the drawings.

Figure 1:
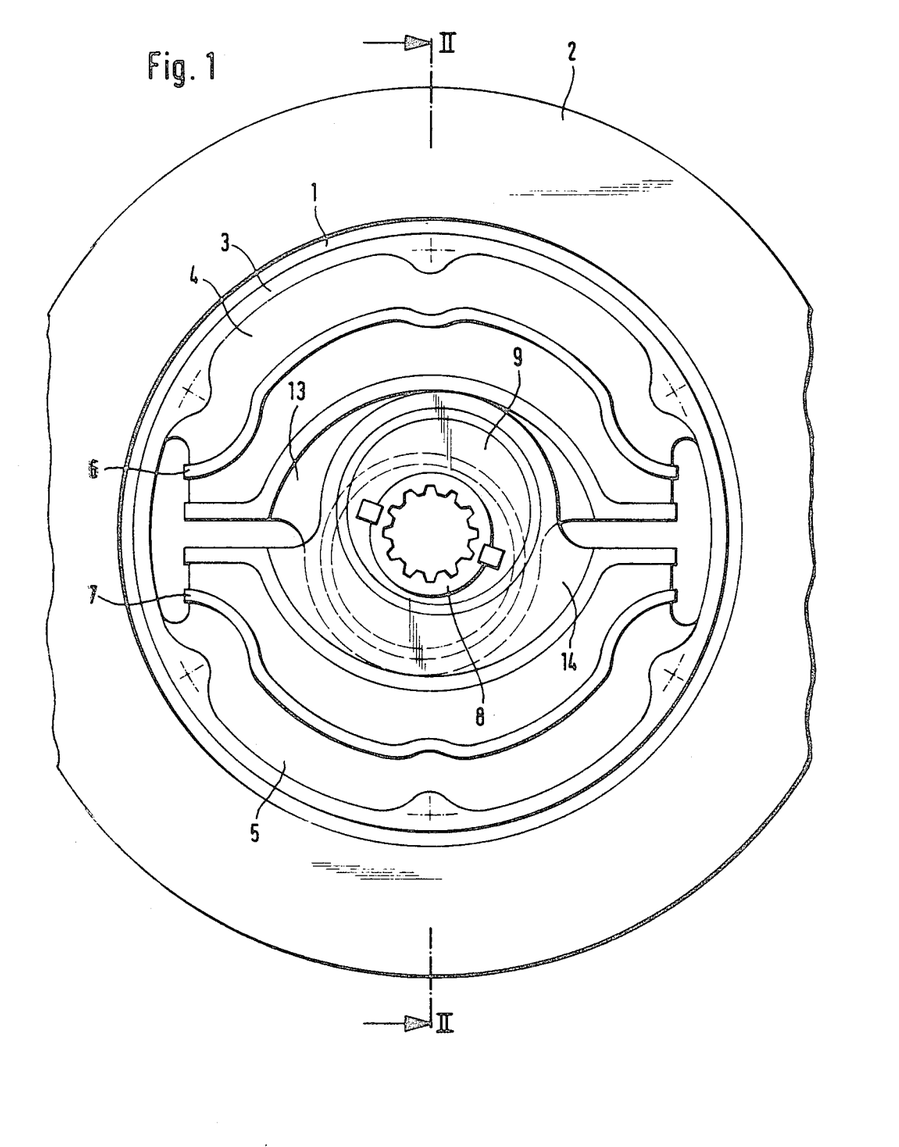
FIG. 1 shows an axial end view of an illustrative example of the rotationally elastic coupling.
Figure 2:
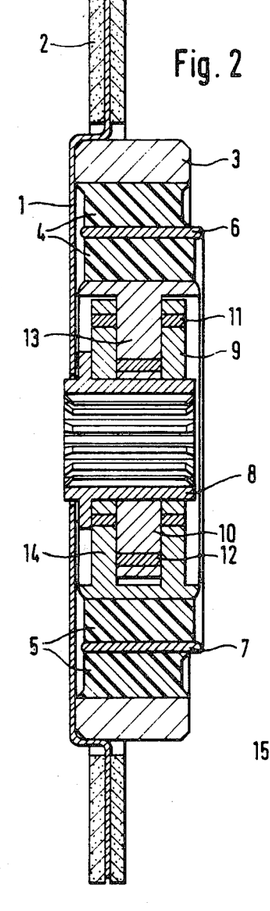
FIG. 2 shows a section along II—II in FIG. 1.

FIGS. 1 and 2 show an illustrative example of the rotationally elastic coupling as part of a clutch for motor vehicles. The clutch plate 1 with the clutch linings 2 is rotationally solidly connected to a cylindrical steel ring which forms one half coupling 3 of the rotationally elastic coupling. Two diametrically opposed elastomer bodies 4, 5 are rotationally solidly vulcanized onto the inner side of the annular half coupling 3; these elastomer bodies serve as sprung elastic intermediate links of the rotationally elastic coupling. The elastomer bodies 4, 5 have at least substantially the shape of cylindrical half shells and, to increase their form factor, i.e. to increase the shape stiffness by preventing lateral extension under compressive load, are each provided with an enclosed sheet metal part 6, 7.

The gear box shaft sleeve of the clutch serves as the second half coupling 8 of the rotationally elastic coupling. The second half coupling 8 is rotationally solidly connected with two eccentric discs 9, 10 which, in the illustrative example shown here, are shown in a knife and fork arrangement for reasons of mass balance.

The eccentric discs 9, 10 are rotatively supported by means of roller bearings or journal bearings 11, 12 in bearing shells 13, 14, which are solidly connected by vulcanization with the sprung intermediate links 4, 5, in this case with elastomer bodies. The bearings 11, 12 are themselves placed eccentrically in the bearing shells 13, 14 in the manner visible from FIG. 1, in such a way that in the manner also visible from FIG. 1 the zero position of the coupling and the eccentric with the coupling unloaded is rotated out of the dead centre position of the eccentric, referred to the sprung intermediate links 4, 5.

With relative twist of the half couplings 3 and 8 of the rotationally elastic coupling, the bearing shells 13, 14 are forced substantially radially outwards against the spring force of the sprung intermediate links 4, 5. This radially outwards movement has superimposed on it a slight lateral displacement of the two bearing shells 13, 14 in the opposite direction. The resulting additional shear loads in the elastomer bodies designed as sprung intermediate links 4, 5 are, however, negligible compared with the primary radially directed compressive stress deformations because of their order of value.

Figure 3:
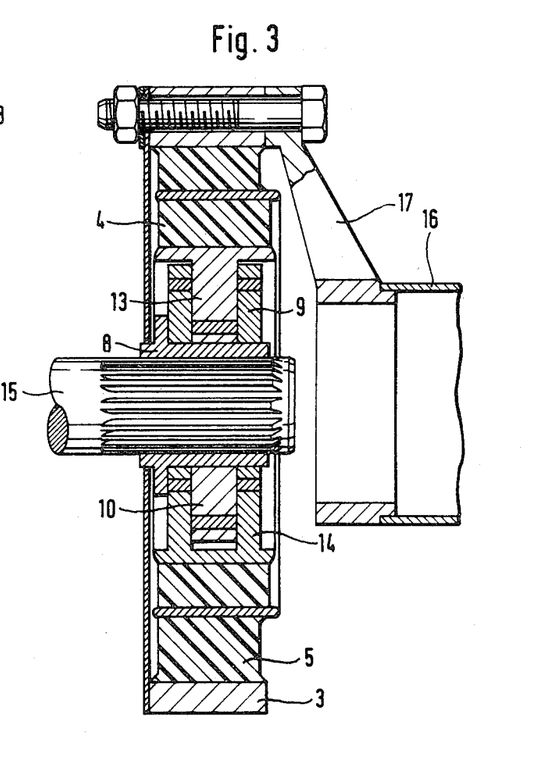
FIG. 3 shows a modified illustrative example of the rotationally elastic coupling in accordance with FIG. 1.

FIG. 3 shows, when compared with FIG. 2, a modified illustrative example of the coupling represented in FIGS. 1 and 2. As regards the construction of the important functional parts of the rotationally elastic coupling, the illustrative example shown in FIG. 3 corresponds to the illustrative example also shown in FIG. 2. In contrast to the illustrative example shown in FIG. 2, however, the coupling shown in FIG. 3 is not a clutch but a solid coupling through which a torque is transmitted from an input shaft 15 to an output shaft 16 via a solid connection 17. There, the input shaft 15 is connected with one half coupling 8 and the output shaft 16 via the solid connection 17 with the other half coupling 3.

Figure 4:
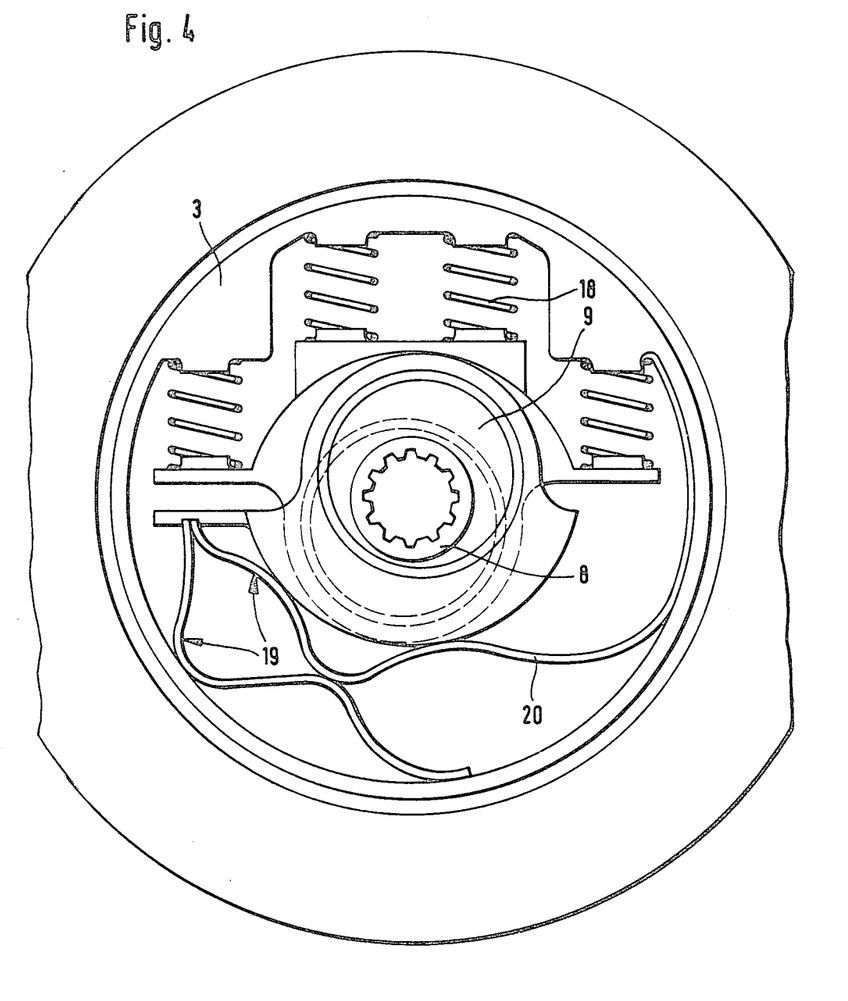
FIG. 4 shows a further illustrative example of the rotationally elastic coupling.

The end view in the axial direction of FIG. 4 shows an illustrative example of the rotationally elastic coupling of the type shown in FIG. 1 in which the elastomer bodies 4, 5 shown in FIG. 1 are replaced by steel spring elements and, in detail, by helical springs 18, an elliptical spring element 19 and a specially adapted shaped leaf spring 20.

By increasing the friction in the eccentric bearings, by additional friction discs or plate springs, for example, the spring characteristic of the rotationally elastic coupling can be supplemented by an adjustable damping characteristic.

In addition, if the coupling is equipped with several eccentrics, it does not have to have the knife and fork arrangement shown in FIGS. 2 and 3, but the individual eccentric discs with their bearings and sprung intermediate links can be assembled on top of one another in series in knife and fork arrangement and, for example, finally retained in a common cage and then provided with a precalculated mass balance. Particularly in the case of mass production of the rotationally elastic coupling, such an arrangement of the coupling is advantageous.

Figure 5:
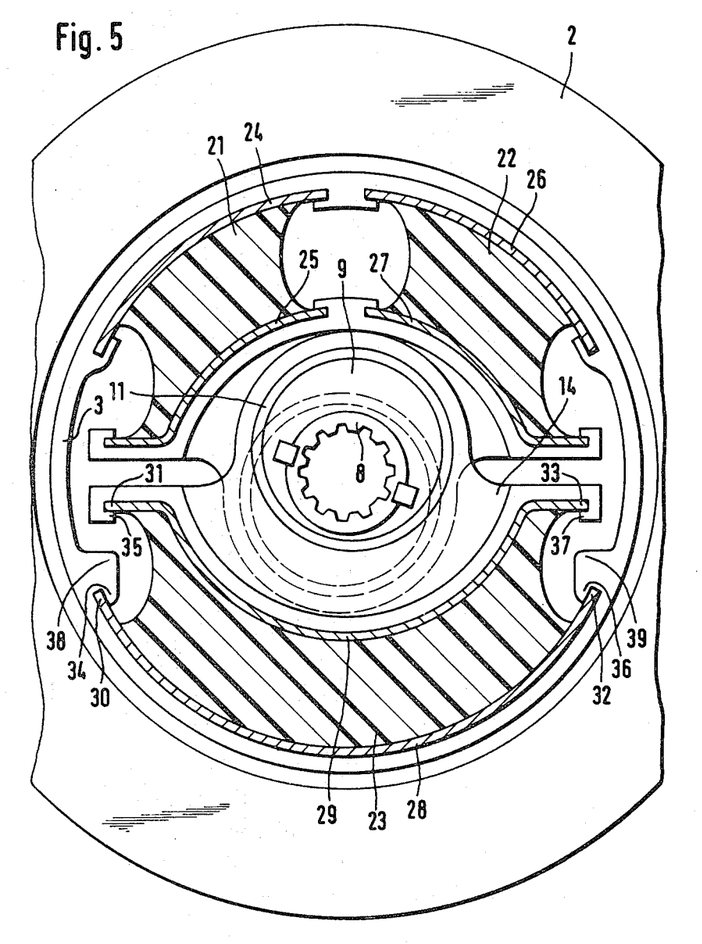
FIG. 5 shows an illustrative example of the rotationally elastic coupling in an axial end view of the type of FIG. 1 with axially insertable rubber springs.

FIG. 5 shows an axial end view of a rotationally elastic coupling of the type shown in FIG. 1 in which the sprung intermediate links are embodied as exchangeable elastomer springs 21, 22 and 23. Steel sheets 24, 25, 26, 27, 28, 29 are vulcanized onto the sprung elastomer bodies of each of these elastomer sprung elements on the opposing main surfaces in each case, i.e. radially inward and radially outward referred to the coupling. The edges of these steel sheets protrude beyond the elastomer bodies to which they are vulcanized in the peripheral direction of the coupling. These protruding edges 30, 31 32, 33 engage positively in recesses 34, 35, 36 and 37 of corresponding profile in the peripheral direction of the coupling and operate as guide rails in the axial direction. Of these recesses, those in engagement with one of the two external metal sheets, in each case, of the elastomer spring are positively connected with one of the two half couplings whereas those engaging, in each case, with the opposite external metal sheet of the same elastomer spring are force-connected with the respective other half coupling. Thus in the illustrative example shown in FIG. 5, the outer edges 30 and 32 of the external metal sheet 28 of the elastomer spring 23 can for example be moved axially and are held positively in the peripheral direction under the recesses 34, 36, which are positively connected or designed, in one piece in this case, with the radially outer half coupling 3. In a similar manner, the edges 31, 33 of the radially inward metal sheet 29 of the elastomer spring 23 are axially displaceable in the recesses 35, 37 and held by shape in the peripheral direction in the bearing shell 14, which is force connected via the bearing 11 and the eccentric 9 with the inner half coupling 8. In this connection, it is not, of course, necessary for the elastomer spring 23 to be incorporated as only one large spring as shown at the bottom of FIG. 5. It can, for example, be in the form of two individual springs 21, 22, as shown in the upper part of FIG. 5 and can, of course, also take the form of three, four or more springs. Furthermore, the elastomer springs do not need to consist of a continuous elastomer block between inner and outer retaining metal sheets, as shown in FIG. 5. They can of course, in a manner known per se, contain at least one, as shown for example in the type indicated in FIG. 1, and preferably several intermediate metal sheets which have been vulcanized in, in order to reduce the lateral extension of the springs and increase the shape stiffness in a manner known per se.

Additionally to the illustrative embodiment of the rotationally elastic coupling shown in FIG. 1, the illustrative embodiment shown in FIG. 5 has end stop edges 38, 39, which limit the radial displacement path of the bearing shell 14. Thus whereas the rotationally elastic coupling shown in FIG. 1 "slips" on overload and thus, for example, protects engines or driven equipment from overload, the rotationally elastic coupling shown in FIG. 5 leads to a solid connection between the input shaft and the output shaft in the direction of the load in the case of overload; this is necessary for safety reasons in many cases, for example in lifts.

The end stop shown only in the lower part of the coupling in FIG. 5 can, of course, also be provided in addition in the upper part of the coupling so that each of the two bearing shells 13, 14 shown in FIG. 5 is thus radially displaceable to a limited extent by means of end stops.

Figure 6:
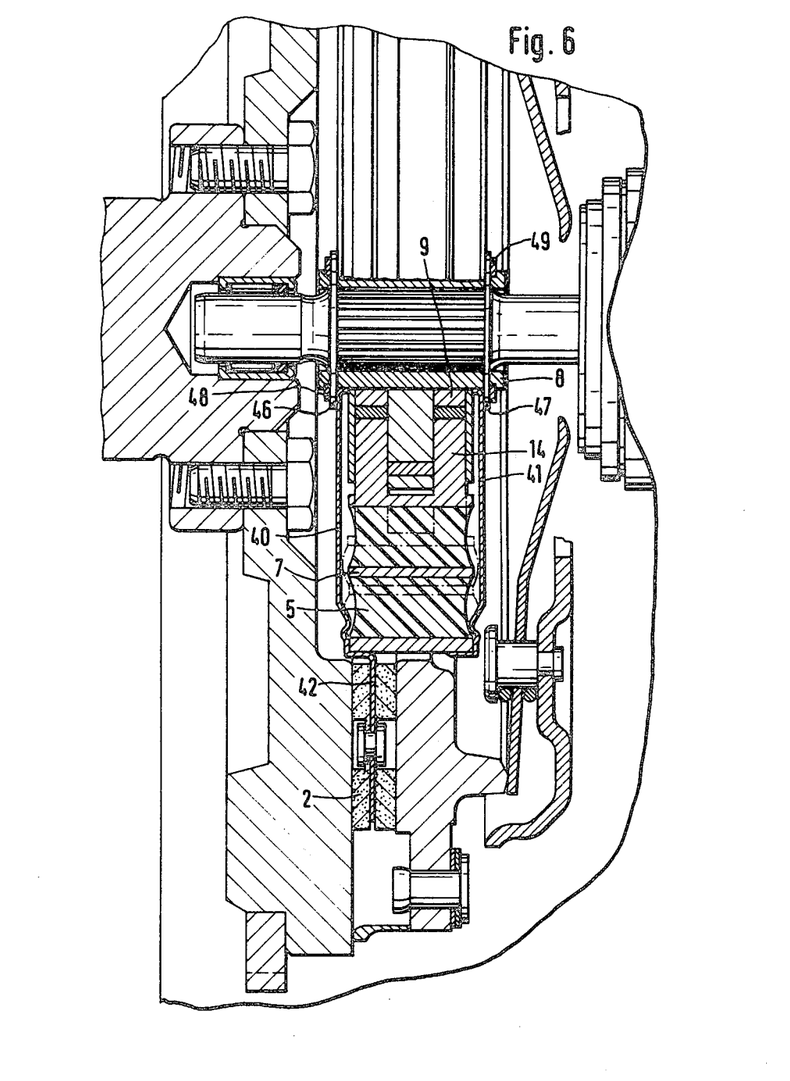
FIG. 6 shows an illustrative example of the rotationally elastic coupling with rubber springs in a partial axial section corresponding to FIG. 2 in the unloaded and in the loaded condition with metal sheet encapsulation on both sides.

FIG. 6 shows an axial partial section of an illustrative embodiment of the rotationally elastic coupling which differs from the illustrative embodiment shown in FIG. 2 by the encapsulation of the coupling on both end faces. The encapsulation sheets 40, 41 placed on the two opposing end faces and centred on the clutch sleeve 8 serve to limit the deformation of the elastomer layers of the sprung intermediate links 4, 5 in the axial direction under load, thus stiffening the spring characteristic of the rotationally elastic coupling. One of these encapsulating sheets, namely the encapsulating sheet 40, is arranged at the same time to be in one piece with the lining carrier plate 42. In FIG. 6, the rubber elastic intermediate link 5 is shown with full lines in the unloaded condition while the loaded deformed condition occurring when the coupling is loaded and which is caused by the compressive load on the intermediate link in the radial direction, is shown with dotted lines.

Figure 7:
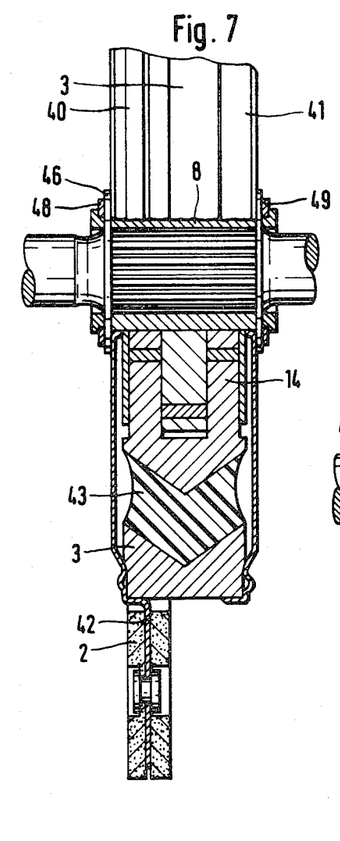
FIG. 7 shows, in an axial partial section, a profile of the rubber spring of the rotationally elastic coupling deviating from the rectangular shape.
Figure 8:
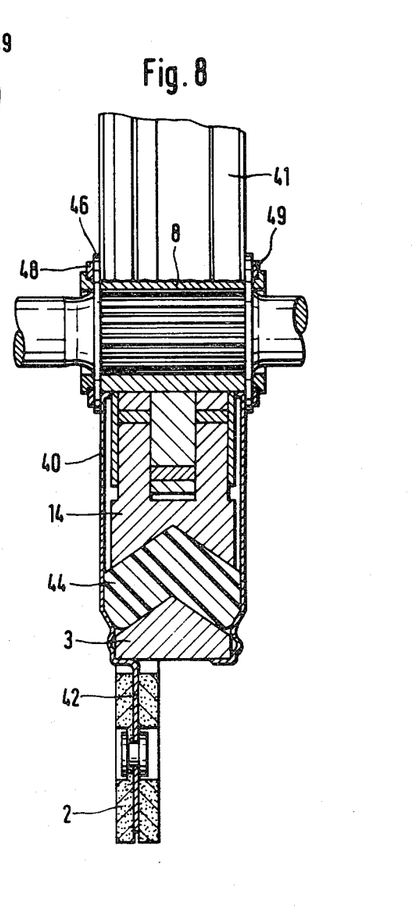
FIG. 8 shows a further profile of the rubber spring of the rotationally elastic coupling in a representation corresponding to FIG. 7.
Figure 9:
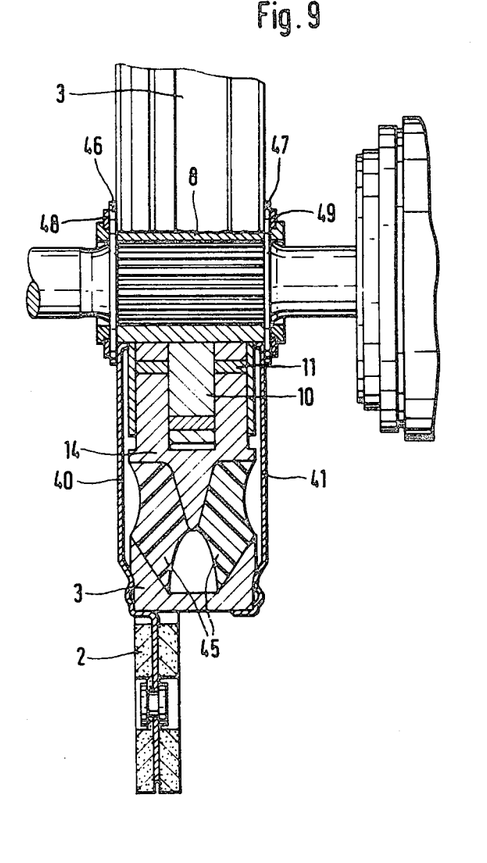
FIG. 9 shows an illustrative example of the rubber spring of the rotationally elastic coupling in which the rubber spring is divided axially into two symmetrical elements.

Three further versions of an encapsulated rotationally elastic coupling are shown in FIGS. 7, 8 and 9 in a representation corresponding to that of FIG. 6. They differ from the illustrative embodiment shown in FIG. 6 by the differing profile of the elastomer springs 43 (FIG. 7), 44 (FIG. 8) and 45 (FIG. 9).

Apart friom the fact that the elastomer spring shown in FIG. 7 has an angle pointing radially outwards and the elastomer spring 44 shown in FIG. 8 has an angle pointing radially inwards, the two elastomer springs differ substantially in the fact that the elastomer spring 43 in the unloaded condition of the coupling shown in FIG. 7 lies well away from the encapsulating sheets 40, 41 whereas the elastomer spring 44 shown also in the unloaded condition in FIG. 8 is in contact with the encapsulating sheets 40, 41. On loading the coupling shown in FIG. 7, therefore, the elastomer spring 43 can deform initially in the axial direction without resistance until the point is reached when the elastomer comes into contact with the encapsulating sheets 40, 41. Only then is further deformation prevented leading to a steeper progression of the spring characteristic of the coupling, i.e. to a "stiffening" of the coupling after an initially soft spring characteristic. In contrast, the coupling shown in FIG. 8 has a relatively strongly progressive variation of the spring characteristic of the coupling right from the beginning.

Whereas FIG. 8 shows an illustrative embodiment of the rotationally elastic coupling which, in comparison with the coupling shown in FIG. 7, has a strongly progressive spring characteristic right from the beginning, the rotationally elastic coupling shown in FIG. 9 has, at the beginning, an even softer initiation of the spring characteristic, i.e. an even flatter variation of the torque as a function of the twist angle than is the case with the illustrative embodiment shown in FIG. 7. This is due to the fact that the elastomer spring 45 (FIG. 9) when subjected to compression in the radial direction can deform both axially inwards and axially outwards. Due to the contact of the two part springs with one another in the axially inward direction and with the encapsulating sheets 40, 41 in the axially outward direction, the spring characteristic of the rotationally elastic coupling shown in FIG. 9 then also becomes strongly progressively.

In FIGS. 6, 7, 8 and 9, the encapsulating sheets 40, 41 shown there are pressed in the same manner onto the inner half coupling 8, which is formed as a sleeve, and axially secured in each case by a shim washer 46, 47 and in each case by a protruding circlip 48, 49. This axial fixing can, of course, also occur in principle in any other desired manner. Furthermore, a series of characteristics known per se in the construction of couplings can be effected in the rotationally elastic coupling without departing from the framework of the invention. Thus, for example, the lining carrier plate 42 need not be arranged as a flat annular disc (as shown here for simplicity) but can quite easily also be arranged in a manner known per se to be corrugated as a lining carrier spring. It is also open to the expert to apply as required known and conventional pre-dampers in association with the rotationally elastic coupling in accordance with the invention.

We claim:
1. A rotationally elastic coupling comprising two rotatable half coupling means, an eccentric disc means mounted on one of said half coupling means, said eccentric disc means being displaced along a translatory path of travel upon rotation of said one half coupling means, resilient means mounted on said other half coupling means, said resilient means being disposed within said translatory path of travel of said eccentric disc means such that said resilient means is compressed generally radially outwardly in resiliently resisting relative rotation between said two half coupling means, whereby said two rotatable half coupling means are thereby resiliently coupled.

2. A rotationally elastic coupling according to claim 1, wherein said resilient means is disposed generally radially outwardly of said eccentric disc means.

3. A rotationally elastic coupling according to claim 1, wherein said eccentric disc means comprises an eccentric disc element and a bearing disposed on said disc element.

4. A rotationally elastic coupling according to claim 3, wherein said bearing is disposed on the outer periphery of said disc element.

5. A rotationally elastic coupling according to claim 3, wherein said eccentric disc means further comprises a bearing-receiving part, said bearing-receiving part receiving said bearing and providing for relative movement between said bearing-receiving part and said eccentric disc element.

6. A rotationally elastic coupling according to claim 5 further comprising stop means on said bearing-receiving part and on said other half coupling means for limiting the relative rotation between said two half coupling means.

7. A rotationally elastic coupling according to claim 5, wherein said bearing-receiving part is affixed to said resilient means, said bearing-receiving part having a circular opening in which said bearing is received.

8. A rotationally elastic coupling according to claim 3, wherein there are a plurality of said disc elements.

9. A rotationally elastic coupling according to claim 8, wherein at least one disc element is 180 degrees offset relative to at least one other disc element.

10. A rotationally elastic coupling according to claim 1, wherein said resilient means comprises an elastomer.

11. A rotationally elastic coupling according to claim 1, wherein said resilient means comprises an elastomer member and a metal part disposed within said elastomer member.

12. A rotationally elastic coupling according to claim 1, wherein said resilient means comprises a generally cylindrically curved elastomer member.

13. A rotationally elastic coupling according to claim 1, wherein said resilient means comprises metal springs.

14. A rotationally elastic coupling according to claim 1 further comprising restraining means on said other half coupling means for limiting the expansion of said resilient means in an axial direction.

15. A rotationally elastic coupling comprising two rotatable half coupling means rotatable about a common axis, an eccentric disc means mounted on one of said half coupling means and being eccentrically disposed relative to said common axis, a bearing means mounted on said eccentric disc means, said bearing means being displaced along an orbital path of travel relative to said common axis upon rotation of said eccentric disc means, resilient means mounted on said other half coupling means, said resilient means being disposed within said orbital path of travel of said bearing means such that said resilient means is compressed generally radially outwardly in resiliently resisting relative rotation between said two half coupling means, whereby said two rotatable half coupling means are thereby resilient coupled.

16. A rotationally elastic coupling comprising two rotatable half coupling means rotatable about a common axis, an eccentric disc mounted on one of said half coupling means and being eccentrically disposed relative to said common axis, a bearing mounted on said eccentric disc, a bearing-receiving means receiving said bearing such that said bearing provides for relative rotational movement between said eccentric disc and said bearing-receiving means, said bearing-receiving means being displaced along a translatory path of travel upon rotation of said eccentric disc, resilient means mounted on said other half coupling means, said resilient means being disposed within said translatory path of travel of said bearing-receiving means such that said resilient means is compressed generally radially outwardly in resiliently resisting relative rotation between said two half coupling means, whereby said two rotatable half coupling means are thereby resiliently coupled.

17. A rotationally elastic coupling according to claim 16, whrein said eccentric disc has an outer periphery formed as a circle, the center of said circle orbiting about said common axis upon rotation of said one half coupling means.

18. A rotationally elastic coupling according to claim 16, wherein said resilient means comprises an elastomer member disposed between metal sheet elements, said other half coupling means having axially disposed receiving grooves for slidably receiving edge portions of one of said metal sheet elements, said bearing-receiving means having axially disposed receiving grooves for slidably receiving edge portions of the other of said metal sheet elements.

19. A rotationally elastic coupling according to claim 16, wherein said two rotatable half coupling means are rotatable greater than 90 degrees relative to one another.

20. A rotationally elastic coupling according to claim 16, wherein said two rotatable half coupling means are rotatable up to 180 degrees relative to one another.

21. A rotationally elastic coupling comprising two rotatable half coupling means, an eccentric disc means mounted on one of said half coupling means, said eccentric disc means being displaced along a translatory path of travel upon rotation of said one half coupling means, resilient means mounted on said other half coupling means, said resilient means being disposed within said translatory path of travel of said eccentric disc means such that said resilient means is extended generally radially inwardly in resiliently resisting relative rotation between said two half coupling means, whereby said two rotatable half coupling means are thereby resiliently coupled.

22. A rotationally elastic coupling comprising two rotatable half coupling means, an eccentric means mounted on one of said half coupling means, said eccentric means being displaced along a translatory path of travel upon rotation of said one half coupling means, resilient means mounted on said other half coupling means, said resilient means being disposed within said translatory path of travel of said eccentric means such taht said resilient means is resiliently displaced generally in a radial direction in resiliently resisting relative rotation between said two half coupling means, whereby said two rotatable half coupling means are thereby resiliently coupled.

* * * * *